Figure 1:
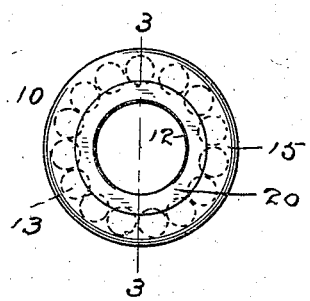

No. 886,949. PATENTED MAY 5, 1908.
R. G. CORNFORTH.
BALL BEARING.
APPLICATION FILED MAY 6, 1907.

WITNESSES
H. A. Lamb.
S. W. Atherton.

INVENTOR
Robert G. Cornforth
BY
N. M. Wooster
ATTORNEY

UNITED STATES PATENT OFFICE.

ROBERT G. CORNFORTH, OF SEYMOUR, CONNECTICUT.

BALL-BEARING.

No. 886,949.

Specification of Letters Patent.

Patented May 5, 1908.

Application filed May 6, 1907. Serial No. 371,949.

*To all whom it may concern:*

Be it known that I, ROBERT G. CORNFORTH, a citizen of the United States, residing at Seymour, county of New Haven, State of Connecticut, have invented a new and useful Ball-Bearing, (Case A,) of which the following is a specification.

This invention has for its object to provide a ball bearing adapted for general use, in which the number of parts shall be reduced to the minimum and all of which may be easily and inexpensively formed from sheet metal and may be assembled and secured together in the quickest and least expensive manner possible.

With these ends in view I have devised the simple and novel three-part ball bearing of which the following description in connection with the accompanying drawings is a specification, reference characters being used to indicate the several parts.

Figure 2:
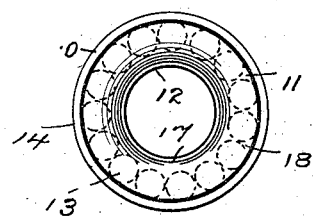
Figure 3:
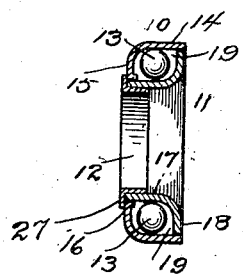

Figure 1 is an elevation illustrating one form of my novel bearing; Fig. 2 a reverse view corresponding therewith; Fig. 3 a section on the line 3—3 in Fig. 1.

My novel bearing comprises three parts only and a set of balls.

The essential feature of the invention is that the balls lie between two members which are secured together by a ring engaging one of the members with a drive fit and provided with a flange partly overlying the other member and acting to retain the parts in the assembled position.

In the drawings, 10 and 11 denotes the members, 12 the ring and 13 the balls. Member 10 comprises a ring-shaped portion indicated by 14 which is provided with an inwardly-turned flange 15 at the edge of which on the inner side is a lip 16 which forms a cup to retain the balls before the parts are assembled. Member 11 consists of a ring-shaped portion indicated by 17 which lies loosely within lip 16 and is provided with an outwardly-turned flange 18 which lies loosely within the end of ring-shaped portion 14 of member 10, thus forming between said members a ball race indicated by 19. Ring 12 lies within ring-shaped portion 17 of member 11 which it engages with a drive fit and is provided with an outwardly-turned flange 27 which extends past the end of ring-shaped portion 17 of part 11 and partly overlies the inwardly-turned flange 15 of member 10. This flange covers the joint between the members, retains the parts in place, and makes the bearing practically dust-proof, leaving member 10 free to rotate independently of member 11 to which the ring is rigidly secured.

Having thus described my invention, I claim:

A ball bearing comprising a ring-shaped member having an inwardly-turned flange with a lip on its inner edge, for the purpose set forth, a second ring-shaped member lying within said flange and having an outwardly-turned flange lying within the edge of the other member whereby a ball race is formed, a set of balls in said race and a ring engaging said second member closely, leaving the other member free to rotate independently thereof, and having an outwardly-extending flange which overlaps the joint between the members and retains the parts in place.

In testimony whereof I affix my signature, in presence of two witnesses.

ROBERT G. CORNFORTH.

Witnesses:
 W. R. PEARSON,
 R. M. PARSONS.